United States Patent
Lee et al.

(10) Patent No.: US 7,423,690 B2
(45) Date of Patent: Sep. 9, 2008

(54) IMAGE PHOTOGRAPHING APPARATUS AND ASSEMBLY METHOD THEREOF

(75) Inventors: Chang-hee Lee, Suwon-si (KR); Kyoung-jin Ahn, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 771 days.

(21) Appl. No.: 11/049,971

(22) Filed: Feb. 4, 2005

(65) Prior Publication Data

US 2005/0200748 A1    Sep. 15, 2005

(30) Foreign Application Priority Data

Mar. 10, 2004   (KR) ...................... 10-2004-0016194

(51) Int. Cl.
*H04N 5/225* (2006.01)
(52) U.S. Cl. ................ 348/374; 348/220.1; 348/333.01
(58) Field of Classification Search ......... 348/372–375, 348/220.1
See application file for complete search history.

(56) References Cited

U.S. PATENT DOCUMENTS

| | | | | |
|---|---|---|---|---|
| 5,278,701 | A | 1/1994 | Kawarai et al. | 386/118 |
| 5,493,353 | A | 2/1996 | Chen | 396/429 |
| 6,037,972 | A * | 3/2000 | Horiuchi et al. | 348/221.1 |
| 6,359,649 | B1 * | 3/2002 | Suzuki | 348/220.1 |
| 2003/0020814 | A1 | 1/2003 | Shuji | |
| 2004/0246346 | A1 * | 12/2004 | Kim et al. | 348/222.1 |

FOREIGN PATENT DOCUMENTS

| | | |
|---|---|---|
| JP | 63-156480 | 6/1988 |
| JP | 63-259528 | 10/1988 |
| JP | 63-261330 | 10/1988 |
| JP | 63-261332 | 10/1988 |
| JP | 09127603 | 5/1997 |
| JP | 09186913 | 7/1997 |
| JP | 11249214 | 9/1999 |
| KR | 100209904 | 4/1999 |
| KR | 100209905 | 4/1999 |

* cited by examiner

*Primary Examiner*—Lin Ye
*Assistant Examiner*—Gevell Selby
(74) *Attorney, Agent, or Firm*—Roylance, Abrams, Berdo & Goodman, L.L.P.

(57) ABSTRACT

An image photographing apparatus includes a deck assembly having a deck unit, a main board, and a first camera unit. A first exterior assembly has an opening corresponding to the deck unit, and is connected to one side of the deck assembly. A deck cover assembly is connected to the deck unit to open or close the opening of the first exterior assembly. A second exterior assembly is mounted with a second camera unit and a first display unit, and encompasses the other side of the deck assembly. A rear assembly is connected to the deck assembly to cover the rear side of the deck assembly. A front assembly covers the front side of the deck assembly. An upper assembly is connected to a second display unit and covers the upper portion of the deck assembly.

22 Claims, 9 Drawing Sheets

IMAGE PHOTOGRAPHING APPARATUS AND ASSEMBLY METHOD THEREOF

CROSS-REFERENCE TO RELATED APPLICATIONS

This application claims the benefit under 35 U.S.C. § 119(a) of Korean Patent Application No. 2004-16194 filed Mar. 10, 2004, in the Korean Intellectual Property Office, the entire disclosure of which is hereby incorporated by reference.

BACKGROUND OF THE INVENTION

1. Field of the Invention

The present invention relates to an image photographing apparatus for photographing moving and still images and storing and reproducing the images.

2. Description of the Related Art

In general, a digital still camera (DSC) converts an image that passes through a lens to a digital signal and stores it in a recording medium, such as a hard disk or a memory card. The photographed image is not recorded in a film but stored in the recording medium, and is input directly to a personal computer without going through a scanner. The digital still camera has a high compatibility with personal computers so that anyone may easily edit and modify the image. Also, the photographed image may be transmitted to an external computer.

The DSC generally has the same structure as a camera. That is, the DSC includes a lens, a memory unit, a signal modulation unit, and a display. However, because of its small capacity recording medium, the DSC is mainly used for photographing still images. Although the DSC is capable of photographing moving images to a certain extent, it cannot photograph them for an extended period of time. Usually to photograph moving images, a device for recording sound and reproducing the sound when the photographed moving images are reproduced is additionally required. But the DSC is not typically equipped with such a device, such that it is rather inadequate for photographing moving images and for storing and reproducing the photographed moving images. To resolve these problems, a recording and reproducing device, such as a camcorder, that is capable of recording and reproducing the image and sound of a subject stored in the recording medium, such as a magnetic tape, is broadly used.

The camcorder includes a lens, a signal conversion unit, a deck for recording and reproducing photographed images, and a display. A cassette tape is generally used as a recording medium for the camcorder. The cassette tape is mounted in the deck and may record moving images for about an hour. Further, the camcorder includes a microphone and a speaker. The camcorder is also capable of photographing still images. However, since the picture quality thereof is relatively poor compared to that of the DSC, the camcorder is mainly used for photographing moving images rather than still images. Moreover, compared to the DSC, the camcorder is more complicated and has more functions, thereby generally being more bulky and expensive.

So far customers had to purchase both a DSC and a camcorder to record and reproduce quality still and moving images, which is an economical burden due to the involved expense. In addition, carrying two products together and learning how to operate each adds another level of inconvenience to most customers.

As an attempt to solve the above problems, a digital camera/camcorder, or simply a dual cam system, is provided in which the DSC's function and the camcorder's function for photographing video images are combined in one product so that a user can selectively choose which one to use according to circumstances. However, since two different products with different functions are combined in one system, the dual cam is even more bulky and has a very complicated structure. Therefore, there is a need to develop an image photographing apparatus having a simpler structure that is easy to manufacture and assemble.

SUMMARY OF THE INVENTION

Accordingly, it is a primary object of the present invention to provide an image photographing apparatus and an assembly method thereof in which the assembly of the image photographing apparatus is easy and straightforward.

An image photographing apparatus includes a deck assembly mounted with a deck unit, a main board, and a first camera unit. A first exterior assembly has an opening corresponding to the deck unit and is connected to one side of the deck assembly. A deck cover assembly is connected to the deck unit and opens or closes the opening of the first exterior assembly. A second exterior assembly is mounted with a second camera unit and a first display unit, and encompasses the other side of the deck assembly. A rear assembly is connected to the deck assembly in to cover the rear side of the deck assembly. A front assembly covers the front side of the deck assembly. An upper assembly is mounted with a second display unit and covers the upper portion of the deck assembly.

The deck assembly may include a deck housing installed between the deck unit and the main board, and that supports the deck unit and the main board, respectively.

Preferably, the deck housing includes a main frame to encompass the deck unit and a door frame hinged to the main frame to open and close the deck unit.

The deck cover assembly may be combined with the door frame.

The deck cover assembly may include a support frame made from metallic materials that is connected to the door frame. A cover case is connected to the support frame to cover the opening in the first exterior assembly. A locking and release unit is disposed in the cover case and to lock and release the deck housing.

The cover case may include a memory stick mounting portion.

The first exterior assembly may include a first exterior case complementarily connected to one side of the deck assembly and the rear assembly. An infrared filter operation unit is installed on the first exterior case to turn on and off an infrared filter of the first camera unit.

The first exterior case may be mounted with at least two of the following: a zoom knob, a photo shutter, a mode selection switch, and a recording button.

The rear assembly may include a rear case connected to the deck assembly and having a battery mounting portion. A rear board is supported inside the rear case and is electrically coupled to the main board.

The second exterior assembly may include a second exterior case having the second display unit mounting portion. A sub-board is installed inside the second exterior case and is disposed opposite the main board when the sub board is connected to the deck assembly.

The second camera unit may be supported to the one side of the deck assembly so when the first exterior assembly and the deck assembly are connected, the first and second camera units are arranged in a vertical direction.

The sub-board may be arranged parallel to the main board.

The sub-board may be electrically coupled to the second camera unit and the first display unit, and to the main board when the sub-board is connected to the deck assembly.

The second exterior case may include a speaker unit electrically coupled to the sub-board. A plurality of ports in the second exterior case are adapted to receive external equipment. A plurality of function keys enable a user to select a menu displayed on the first display unit.

The front assembly may include a first and a second lens hood, each being opened in correspondence to the first and second camera units, respectively. A sensor module is supported inside the front case, and has a remote control sensor and a strobe sensor.

The upper assembly may include an upper case to cover the first camera unit and the upper portion of the deck assembly, and to support the second display unit. A microphone is supported by the upper case.

The upper assembly may include a flash movably installed in the upper case to pop in and out of the upper case.

The first camera unit may be a digital video camera module.

The second camera unit may be a digital still camera module.

A method of assembling an image photographing apparatus having a deck assembly including a deck unit, a main board, and a first camera unit. A first exterior assembly has an opening corresponding to the deck unit and encompasses one side of the deck assembly. A deck cover assembly opens or closes the opening of the first exterior assembly. A second exterior assembly is mounted with a second camera unit and a first display unit, and encompasses the other side of the deck assembly. A rear assembly encompasses the rear side of the deck assembly. A front assembly covers the front side of the deck assembly. An upper assembly is mounted with a second display unit and covers the upper portion of the deck assembly. The method includes the steps of preparing a first module by combining the deck assembly, the rear assembly, the first exterior assembly, and the deck cover assembly together. A second module is prepared by combining the second exterior assembly with the upper assembly. The first module is connected to the second module such that the first and second camera units are arranged in a substantially vertical direction. The front assembly is connected to the connected first and second modules.

The first module may be prepared by connecting the rear assembly to the deck assembly. The first exterior assembly is connected on one side of the rear assembly and the deck assembly. The deck cover assembly is connected to the deck unit.

The second exterior assembly may include a sub-board electrically coupled to the first display unit and the second camera unit. The sub-board and the main board are electrically coupled to each other.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above aspects and features of the present invention will be more apparent by describing certain embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Certain embodiments of the present invention will be described in greater detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are not described in detail for conciseness and clarity.

Figure 1:
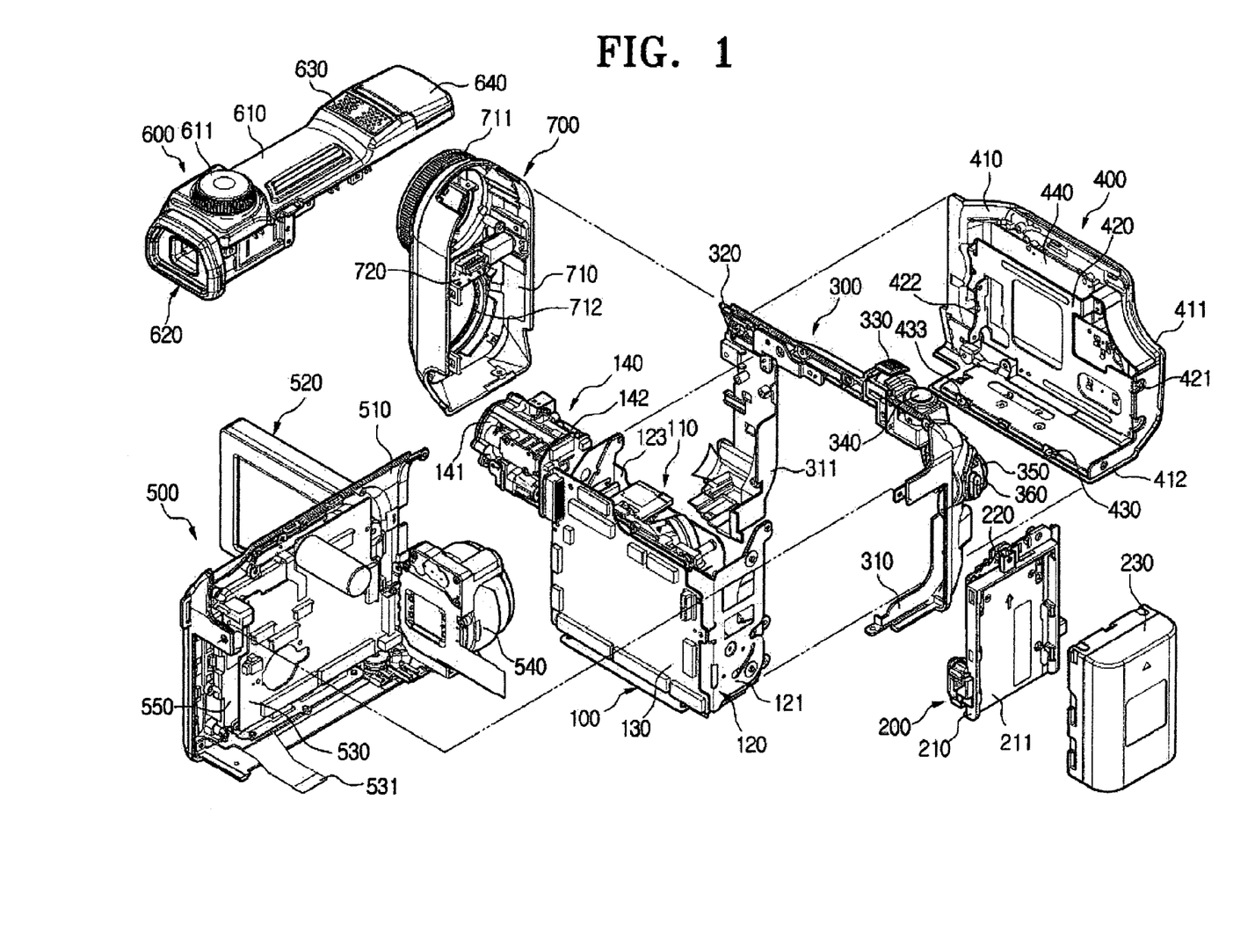
FIG. 1 is an exploded perspective view of an image photographing apparatus in accordance with a preferred embodiment of the present invention.

FIG. 1 is an exploded perspective view of an image photographing apparatus in accordance with an exemplary embodiment of the present invention. As shown in FIG. 1, the image photographing apparatus of the invention includes a deck assembly 100, a rear assembly 200, a first exterior assembly 300, a deck cover assembly 400, a second exterior assembly 500, an upper assembly 600, and a front assembly 700.

The deck assembly 100 includes a deck unit 110, a deck housing 120, a main board 130, and a first camera unit 140.

The deck unit 110 is used for recording data including images in a magnetic tape and reproducing the recorded data. More specifically, a head drum in the deck unit 110 records data in the magnetic tape and reproduces the recorded data. According to the structure of the deck unit 110, a sub-deck moving on a main deck loads or unloads the cassette tape toward the head drum. The structure of the deck unit 110 is well known, so it will not be detailed here.

Figure 3:
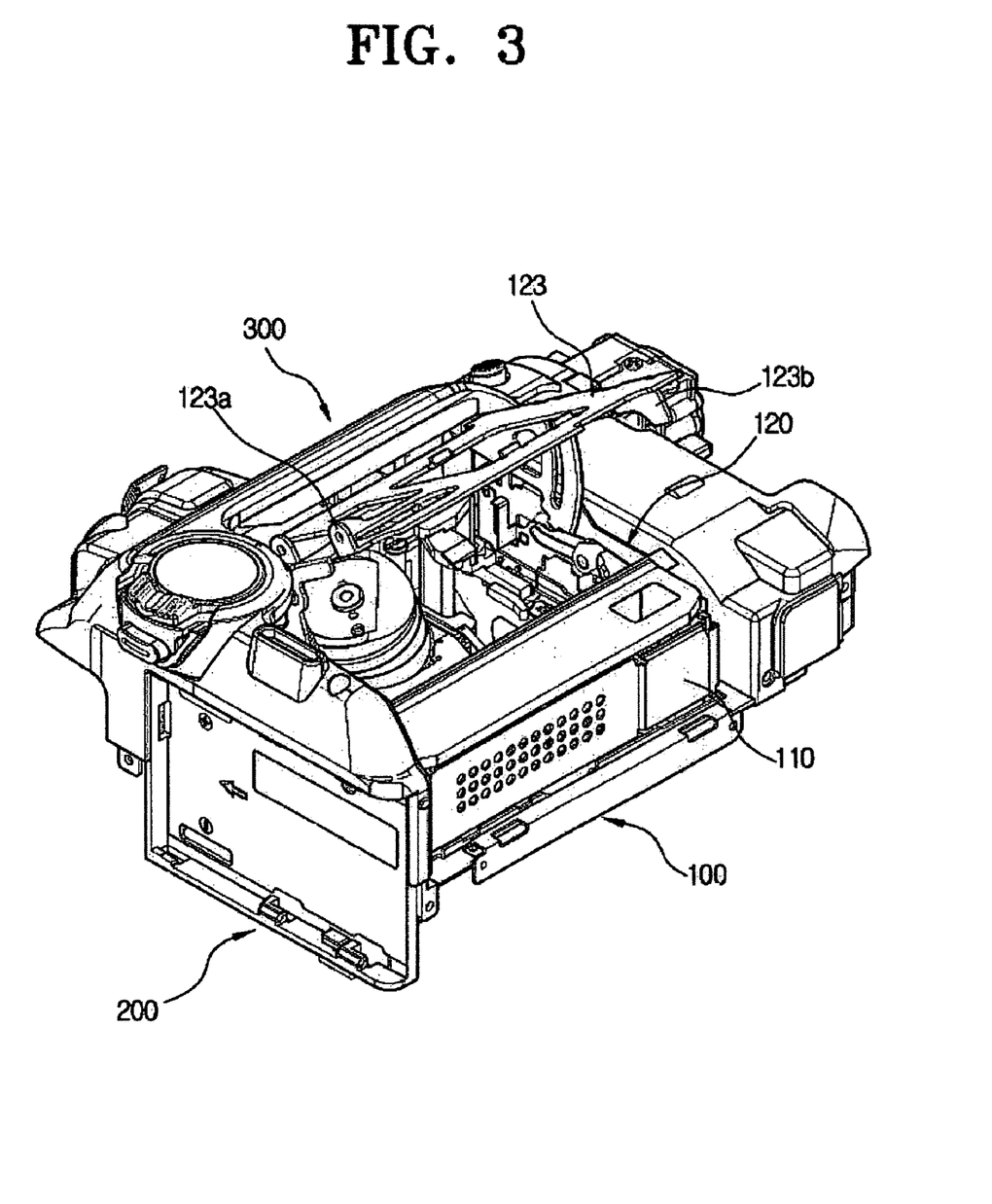
FIG. 3 is a perspective view of a first exterior assembly connected to the rear deck assembly of FIG. 2.
Figure 4:
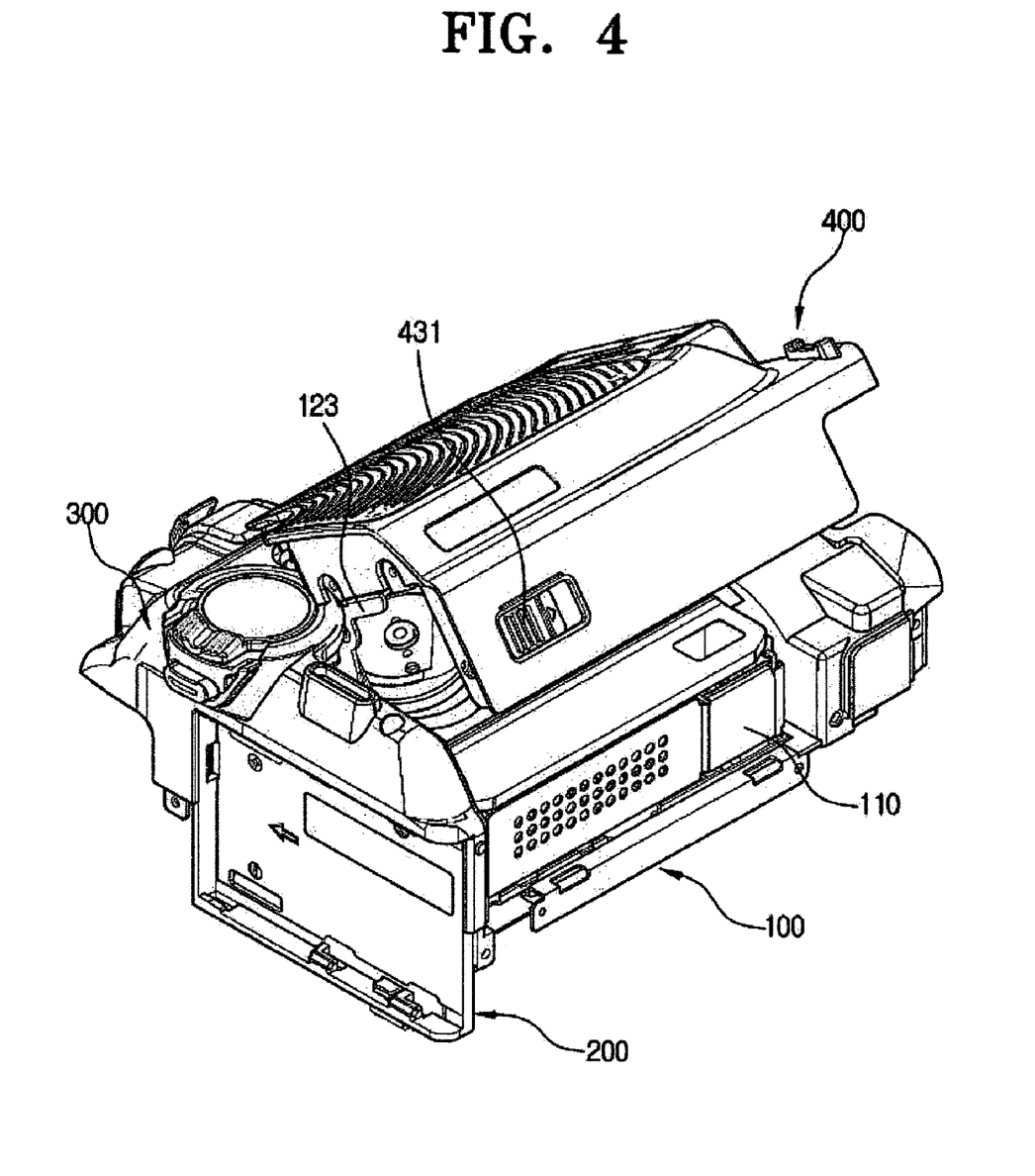
FIG. 4 is a perspective view of a deck cover assembly added to the assembly of FIG. 3.

The deck housing 120 encompasses the deck unit 110 for support, and includes a main frame 121 where the deck unit 110 is mounted on and a door frame 123 hinged to the upper portion of the main frame 121. The door frame 123 is hinged to the main frame 121 to close or open to expose the upper portion of the deck unit 110 when the cassette tape is inserted into or taken out of the deck unit 110. The door frame 123 is connected to the deck cover assembly 400. As shown in FIGS. 3 and 4, when the deck cover assembly 400 is opened, the door frame 123 is also opened. Consequently, the deck unit 110 is exposed, thereby allowing the user to insert the cassette tape therein or to take the cassette tape out of the deck unit. The deck housing 120 made of metallic materials and may be manufactured through a pressing.

The main board 130 is disposed opposite to the deck unit 110, having the main frame 121 therebetween. The main board 130 is electrically coupled to the deck unit 120 and the first camera unit through a connector or flexible printed cable (FPC) to communicate with the deck unit 120 and the first camera unit 140. Several other components may be directly coupled to the main board 130 or through a signal cable.

The first camera unit 140 is combined to the deck housing 120 and the main board 130 for support. The first camera unit 140 is preferably a digital video camera to mainly photograph moving images. This technical construction is also broadly used in camcorders. Also, an infrared filter may be disposed in the camera lens barrel 141 of the first camera unit 140 for infrared photography, including photographing at night. To turn on and off the infrared filter, a filter lever 142 is movably installed outside the camera lens barrel 141.

The rear assembly 200 is connected to the deck housing 120. Preferably, the rear assembly 200 is located near to the body of a photographer. More specifically, the rear assembly 200 is fixed to the main frame so that it is located on the opposite side of the first camera unit 140. The rear assembly 200 includes a rear case 210, and a rear board 220 attached to the inside of the rear case 210. Also, a battery mounting portion is disposed externally of the rear case 210 adapted to receive a battery 230 for the photographing apparatus. The rear board 220 may be electrically coupled to the main board 130 through a signal cable.

The first exterior assembly 300 is connected to cover part of the deck assembly 100. More specifically, the first exterior assembly 300 covers part of the right side of the deck assembly 100. Moreover, the first exterior assembly 300 covers part of the frame of the rear assembly 200 that is first put on the deck assembly 100. The first exterior assembly 300 includes a first exterior case 310 (which is preferably a molding), and an infrared filter operation unit 320 supported by the first exterior case 310. The first exterior case 310 has an opening 311 opposite to the door frame 123 of the deck unit 110. The opening 311 is opened or closed by the deck cover assembly 400. The infrared filter operation unit 320 is movably installed in the first exterior case, and is combined to the filter lever 142, thereby interlocking the filter lever 142. Also, the first exterior case 310 may be mounted with a zoom knob 330 for adjusting the focal distance of a subject, a photo shutter 340 for photographing still images, and a mode selection switch 350 for selecting an operation mode whether to photograph moving images or still images, and a recording button 360. The zoom knob 330 and the photo shutter 340 are preferably connected with each other as one module and are installed inside the first exterior case to be exposed outside of the first exterior case 310. Moreover, the zoom knob 330, the photo shutter 340, the mode selection switch 350, and the recording button 360 being all preferably connected to each other by a signal cable (not shown) and are coupled to the main board 130 through an integrated terminal. Alternatively, only part of the zoom knob 330, the photo shutter 340, the mode selection switch 350, and the recording button 360 may be installed in the first exterior case 310, whereas the other parts may be installed in another assembly.

The deck cover assembly 400 includes a molded cover case 410, a support frame 420 attached to the inside the cover case 410, and a locking and release unit 430 installed inside the cover case 410. The cover case 410 includes a side wall 411 having a shape corresponding to the opening 311 of the first exterior case 310, and a lower wall 412 bent at the bottom end of the side wall 411 that is extended long enough to encompass or cover the lower portion of the deck unit 110. The support frame 420 is made from metallic materials and is connected to the door frame 123 of the deck housing 120. The locking and release unit 430 includes a sliding release knob 431 (refer to FIG. 4) exposed externally of the lower wall 412, and a sliding hook 433 connected to the release knob 431. The hook 433 is elastically biased to the one side by a spring (not shown).

In addition, a recording medium mounting portion 415 (refer to FIG. 5), where a recording medium such as a memory card is mounted, is installed externally of the cover case 410. Inside the cover case 410 and opposite to the recording medium mounting portion 415 is a circuit board 440 that is coupled to the recording medium. The deck cover assembly 400 is assembled after the deck assembly 100 and the first exterior case 300 are assembled. More specifically, to assemble the deck cover assembly 400, the door frame 123 of the deck housing 120 should be opened and the deck cover assembly 400 is put on the opened door frame 123, as shown in FIG. 4, and is connected to the support frame 420.

The second exterior assembly 500 includes a second exterior case 510, a first display unit 520 attached to the outside of the second exterior case 510, a sub-board 530, and a second camera unit 540.

Figure 8:
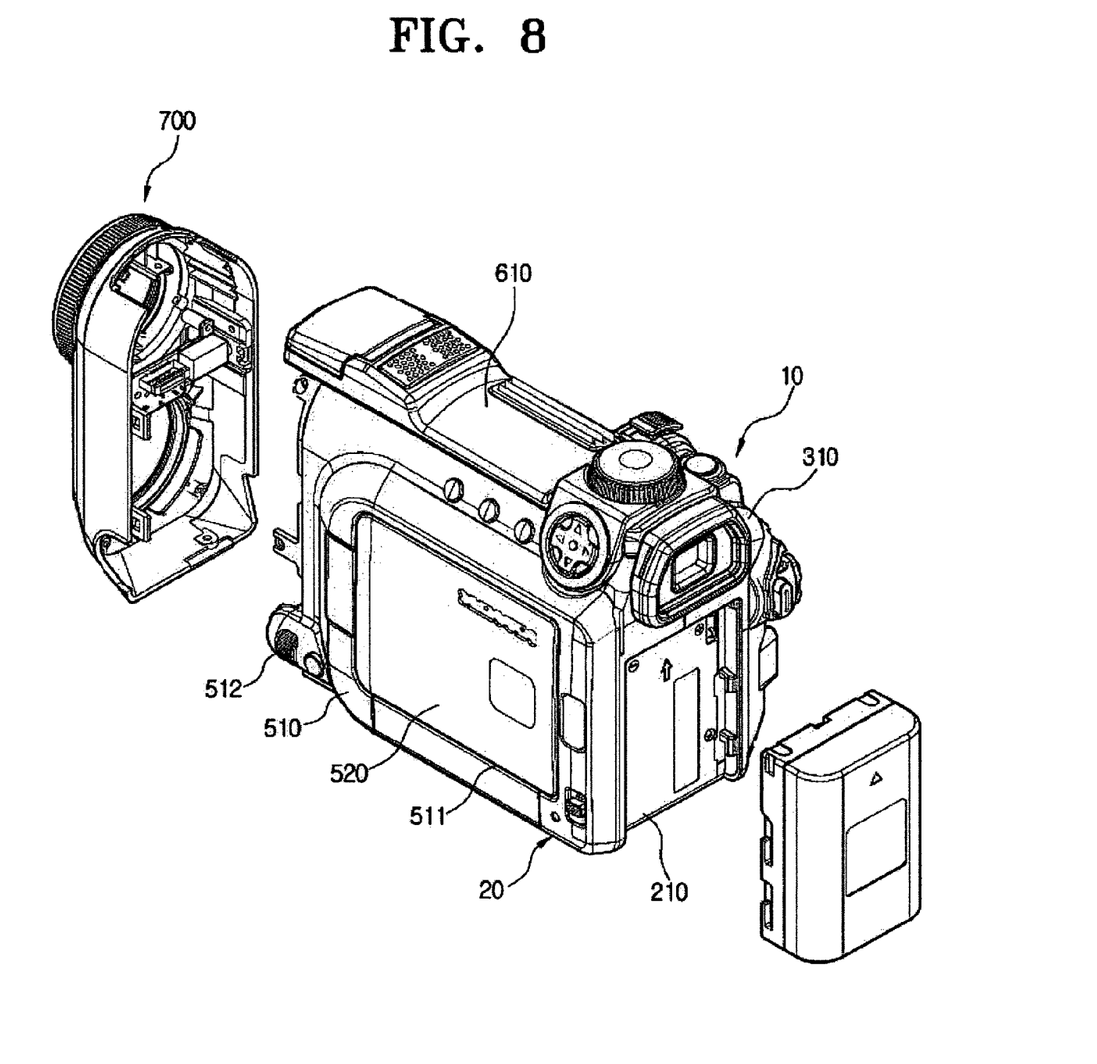
FIG. 8 is a perspective view of assembled first and second modules of FIG. 7.

The second exterior case 510 covers the left side of the deck assembly 100, that is, one side of the main board 130. As shown in FIG. 8, the second exterior case 510 is preferably a molding made from plastic materials, and includes a display mounting portion 511 on its outside. The display mounting portion 511 is preferably installed from outside the second exterior case 510, and the first display unit 520 is placed on it. Also, a roll switch 512 for menu selection is disposed at the second exterior case 510. A speaker unit and a plurality of function keys (not shown) may be installed on a cover 550 covering the display mounting portion 511 from inside. Other function keys may be installed on the second exterior case 510.

Preferably, the second display unit 520 is an LCD panel, and is installed on the second exterior case 510 to have dual axis rotation. The second display unit 520 displays images photographed by the first and second camera units 140 and 540 or images reproduced from the recording medium. The second display unit 520 is electrically coupled to the sub board 530 through a cable.

The sub-board 530 is attached to the inside of the second exterior case 510. The sub-board 530 is electrically coupled to the first display unit 520 and the second camera unit 540. When the first exterior assembly 500 is connected to the deck assembly 100, the sub-board 530 is coupled to the main board 130 through FPC 531. And, the roll switch 512, the speaker unit, and the function keys are electrically coupled to the sub-board 530.

The second camera unit 540 is a digital still camera to mainly photograph still images. Therefore, the second camera unit 540 may include a CCD with a higher pixel density than the first camera unit 140 to photograph high picture quality images. The second camera unit 540 is coupled to the end of the sub-board 530. In effect, when the second exterior assembly 500 and the deck assembly 100 are connected, the second camera unit 540 is attached to the bottom end of the sub board 530 so that it is located at the lower portion of the first camera unit 140.

The upper assembly 600 includes an upper case 610, a second display unit 620, a microphone 630, and a flash 640. The upper case 610 covers the upper portion of the deck assembly 100, and is preferably connected thereto before the second exterior case 510. The second display unit 620 is connected to one end of the upper case 610. Preferably, the second display unit 620 is a viewfinder. The microphone 620 and the flash 640 are installed on the upper case 610 to be exposed. Because the first and second camera units 140 and 540 are disposed in parallel on the front side of the photographing apparatus, the microphone 630 and the flash 640 are disposed at the upper portion of the apparatus, preferably on the upper case 610, to utilize space more effectively. Alternatively, the microphone 630 and the flash 640 may be installed at one of the first exterior assembly 300, the second exterior assembly 500, and the front assembly 700. The flash 640 pops in and out of the upper case 610. The second display unit 620, the microphone 630, and the flash 640 are electrically coupled to the sub-board 530.

Also, a function key module 611 may be installed on the upper case 610 to execute the functions of the digital still camera used in the second camera unit 540. The function key module 611 may be electrically coupled to the sub-board 530.

The front assembly 700 covers the front part of the apparatus where the first and second camera units 140 and 540 are disposed. The front assembly 700 includes a front case 710 and a sensor module 720 installed inside the front case 710. The front case 710 has first and second lens hoods 711 and 712, each being opened corresponding to each camera unit 140 and 540. The lens hoods 711 and 712 are preferably disposed in the vertically, and sometimes they are manufactured as separate parts and then are assembled later in the front case 710.

The sensor module 720 includes a remote control sensor installed on the board, a main strobe sensor, a supplementary strobe sensor, and an infrared LED. This sensor module 720 is electrically coupled to the sub-board 530 or the main board 130.

The following will now explain an assembly method of the photographing apparatus according to an exemplary embodiment of the present invention.

At first, seven assemblies 100, 200, 300, 400, 500, 600, and 700 are prepared, respectively. Each of the assemblies is assembled through different assembly processes, and then are interconnected.

Figure 2:
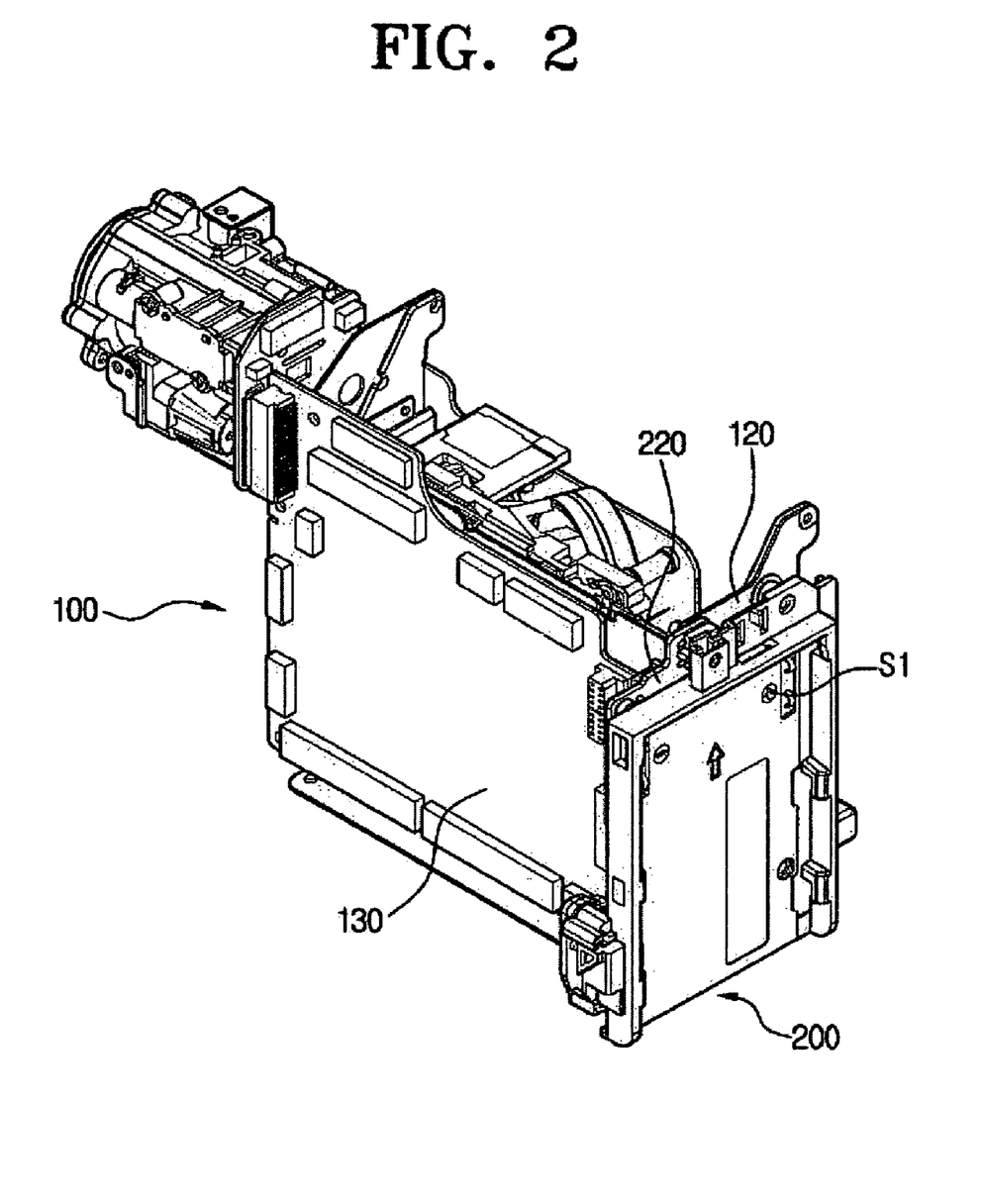
FIG. 2 is a perspective view of a rear deck assembly (a rear assembly and a deck assembly connected together) of FIG. 1.

As shown in FIG. 2, the rear assembly 200 is connected to the deck assembly 100. More specifically, the rear assembly 200 is fastened to the deck housing 120 of the deck assembly 100 through a screw S1. Then the rear board 220 of the rear assembly 200 and the main board 130 are electrically coupled through an FPC.

As shown in FIG. 3, the first exterior assembly 300 is connected to the deck assembly 10 and the rear assembly 200, preferably by screws. At this time, the infrared filter operation unit 320 (refer to FIG. 1) of the first exterior assembly 300 is combined with the infrared filter operation lever 142. The devices 330, 340, 350 and 360 installed in the first exterior assembly 300 are electrically coupled to the main board 130, respectively, preferably through an FPC.

The deck housing 120 is exposed to the right side through the opening 311 of the first exterior case 310. Then the door frame 123 of the deck housing 120 may be opened through the exposed opening, as shown in FIG. 3.

Figure 5:
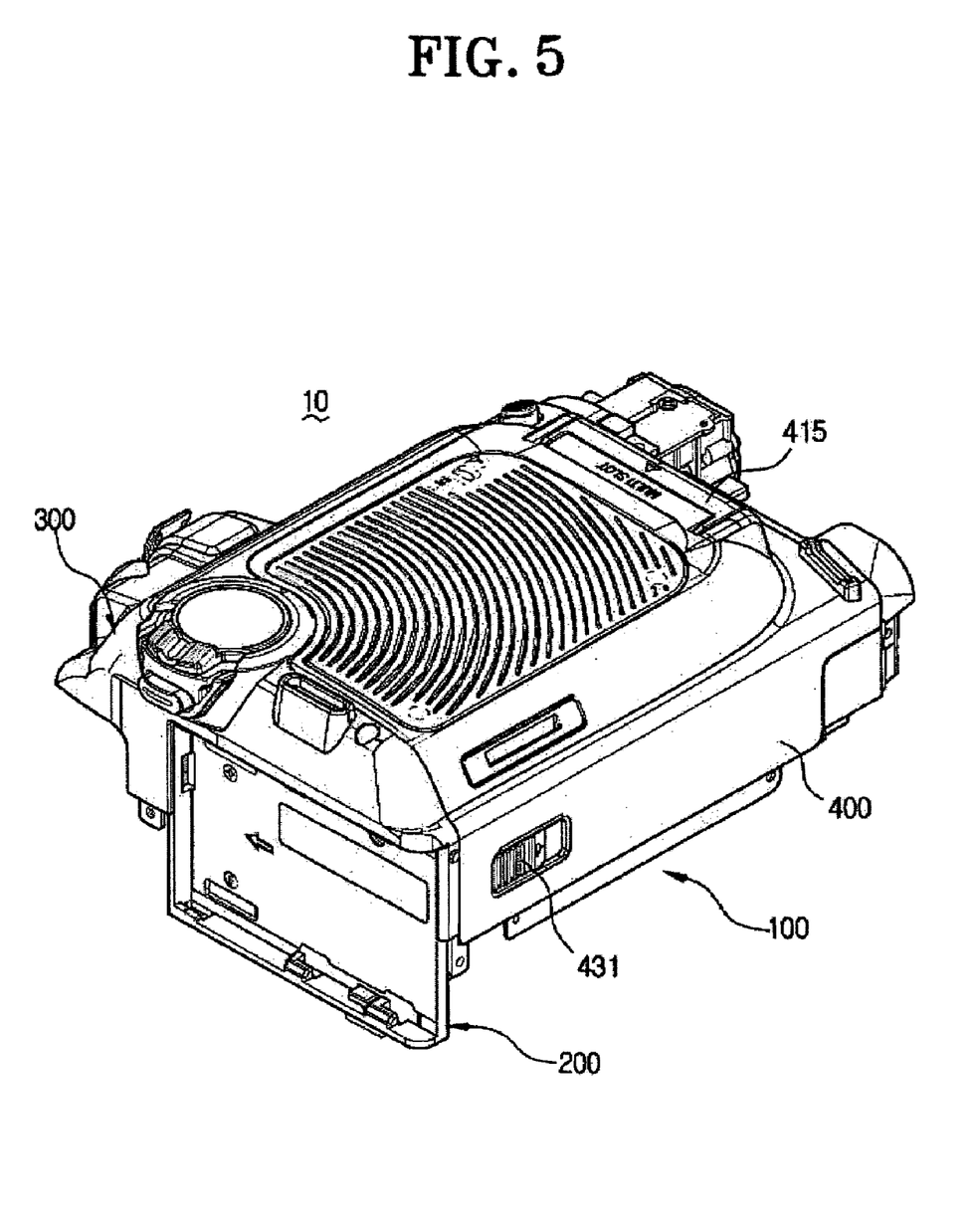
FIG. 5 is a perspective view of a deck cover assembly connected to the assembly of FIG. 4.

While the door frame 123 being opened, the deck cover assembly is put on the door frame 123, as shown in FIG. 4. More specifically, the fastening portions 123a and 123b of the door frame 123 are connected to the fastening portions 421 and 422 of the support frame 420, respectively, preferably by screws. When the deck cover assembly 400 is closed following its assembly, as shown in FIG. 5, the assembly is an assembled first module 10 having four assemblies 100, 200, 300, and 400. The first module 10 may undergo a designated test procedure at this stage of the assembly process.

Figure 6:
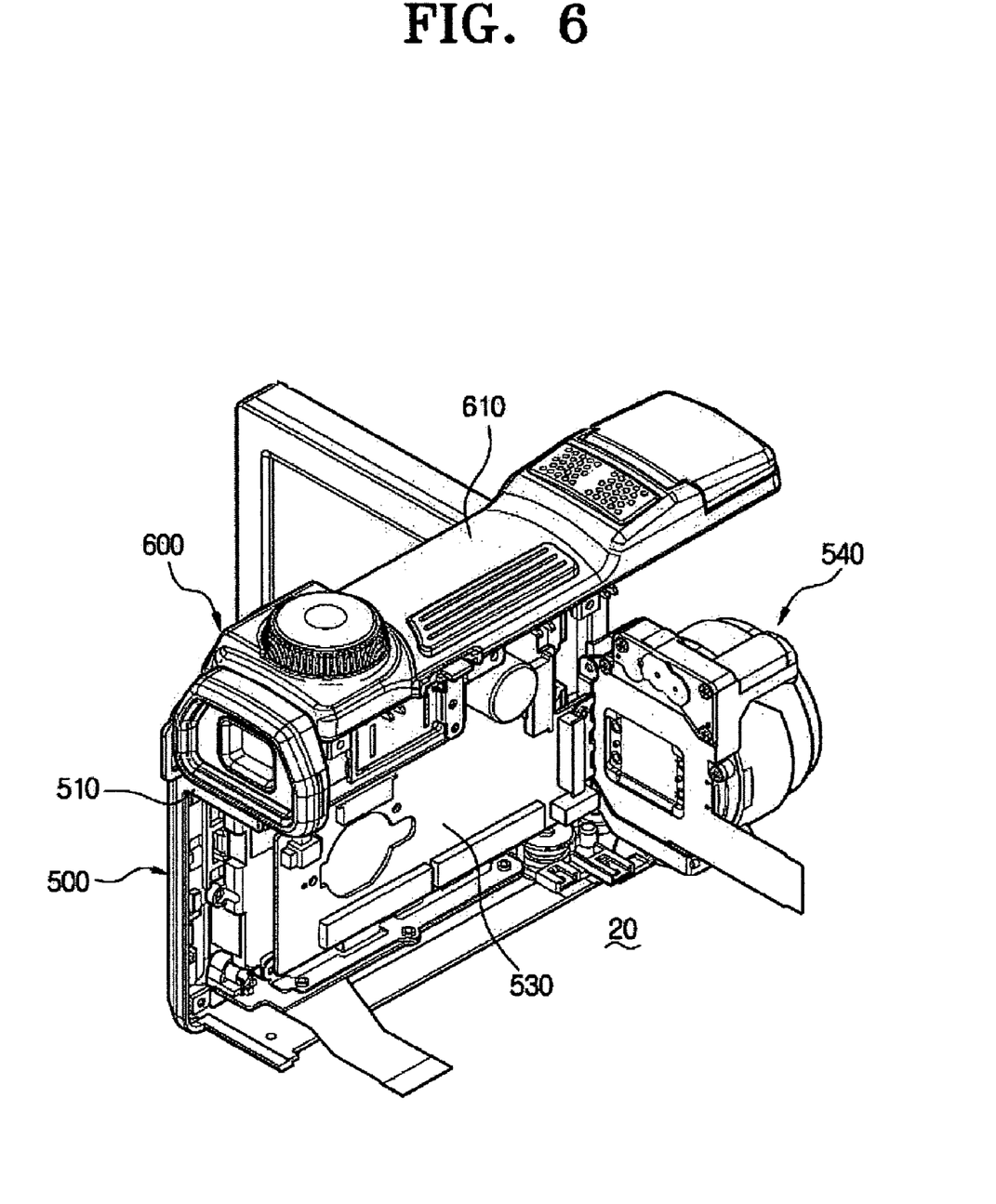
FIG. 6 is a perspective view of a second exterior assembly connected to an upper assembly of FIG. 1.

Next, as shown in FIG. 6, the upper assembly 600 is connected to the second exterior assembly 500. That is, the upper case 610 is screwed to the second exterior case 510. The microphone 630, the flash 640, and the display unit 620 of the upper assembly are electrically coupled to the sub-board 530, preferably through an FPC. This completes the assembly of a second module 20. The second module 20 may undergo a designated test procedure as well.

Figure 7:
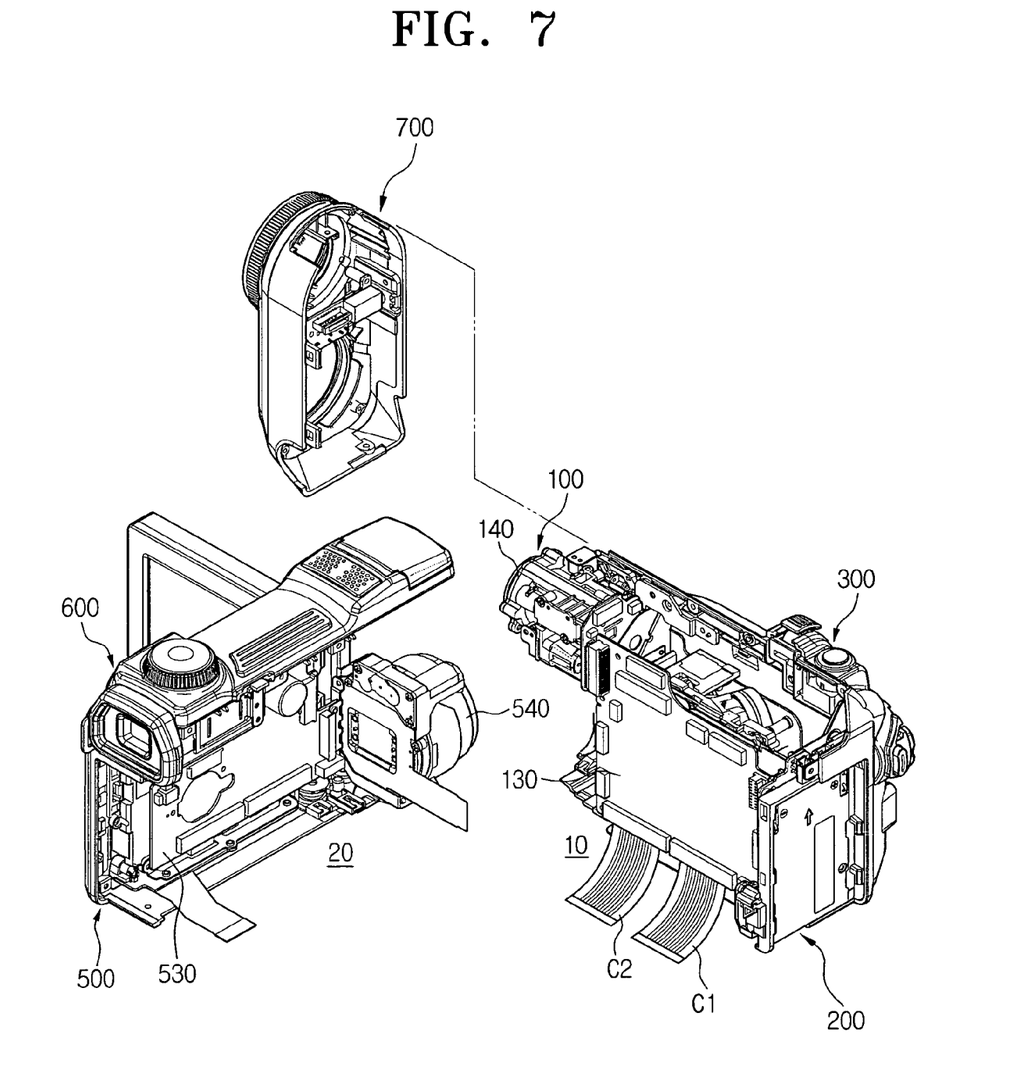
FIG. 7 is an exploded perspective view of connecting a first module of FIG. 5 to a second module of FIG. 6.

If the first and second modules 10, 20 pass the tests, they are connected to each other from the opposite sides, as shown in FIG. 7. The main board 130 and the sub-board 530 are electrically coupled to each other through circuit cables C1 and C2. Another circuit cable 531 of the second module 20 is also coupled to the main board 130. Those two boards 130 and 530 approach each other from opposite sides to locate the second camera unit 540 below the first camera unit 140. As shown in FIG. 8, the first and second modules 10 and 20 are connected to each other in the shape of a photographing apparatus. The first and second exterior cases 310 and 510, the upper case 610, and the rear case 210 are connected to each other, preferably by screws.

Figure 9:
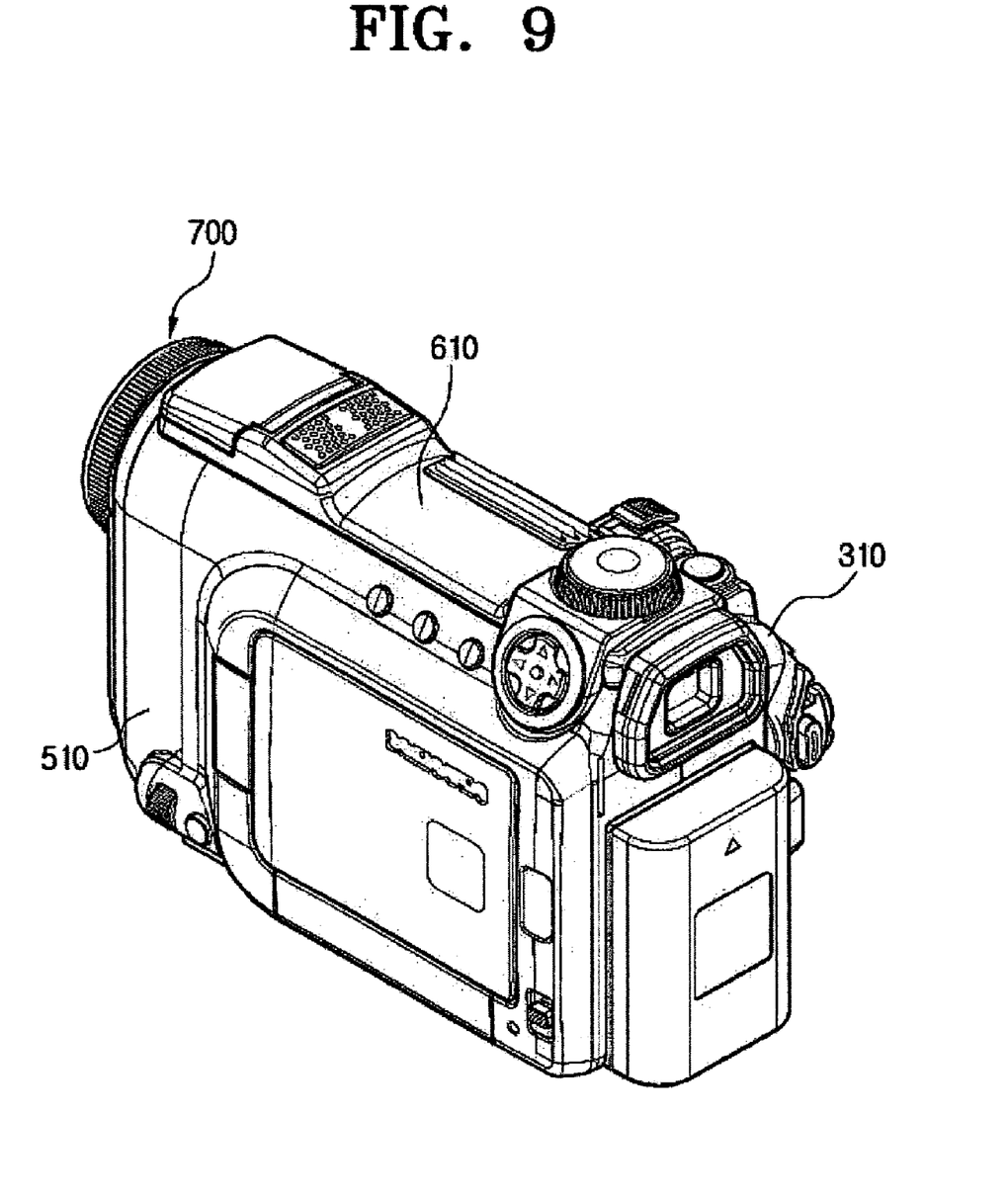
FIG. 9 is a perspective view of a front assembly connected to the assembly of FIG. 8.

Referring to FIG. 8, the front assembly 700 is attached to the front side of the apparatus of which first and second modules 10 and 20 are already assembled. Finally, as shown in FIG. 9, the front assembly 700 is connected to each exterior case 310 and 510 and to the upper case 610, preferably by screws. Preferably, connecting the front assembly is the last step in assembling.

As described above, each part is first assembled in a unit module, and each unit module is assembled to each other in a designated sequence. The assembly method thereof is simple that anyone may easily finish the assembling process.

Since each unit module is assembled to each other following the designated sequence that is set in consideration of the electric connections between the main board and the respective parts, the assembly may be done successfully and efficiently.

Also, the photographing apparatus of the invention is separated into seven unit modules, each being easily replaced. Therefore, customers are provided with excellent warranty services for the product.

The DVC module (the first module) and the DSC module (the second module), each being independently assembled, may go through a designated test, respectively, before they are assembled to each other. In this manner, the number of defective products may be reduced and productivity increased.

The foregoing embodiment and advantages are merely exemplary and are not to be construed as limiting the present invention. The present teaching may be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An image photographing apparatus, comprising:
a deck assembly having a deck unit, a main board, and a first camera unit;
a first exterior assembly having an opening corresponding to the deck unit, and being connected to a first side of the deck assembly;
a deck cover assembly connected to the deck unit to open and close the opening of the first exterior assembly;
a second exterior assembly having a second camera unit and a first display unit connected to the first exterior assembly to encompass a second side of the deck assembly;

a rear assembly connected to the deck assembly to cover a rear side of the deck assembly;

an upper assembly having a second display unit connected to second exterior assembly, the upper assembly covering an upper portion of the deck assembly; and a front assembly connected to the first and second exterior assemblies and to the upper assembly, the front assembly covering a front side of the deck assembly.

2. The apparatus according to claim 1, wherein a deck housing is connected between the deck unit and the main board to support the deck unit and the main board.

3. The apparatus according to claim 1, wherein a main frame encompasses the deck unit; and a door frame is hinged to the main frame to open and close the deck unit.

4. The apparatus according to claim 3, wherein the deck cover assembly is connected to the door frame.

5. The apparatus according to claim 4, wherein a support frame made of metallic materials is connected to the door frame;

a cover case is connected to the support frame to cover the opening in the first exterior assembly; and a locking and release unit is disposed in the cover case to lock and release the deck housing.

6. The apparatus according to claim 5, wherein the cover case has a memory stick mounting portion.

7. The apparatus according to claim 1, wherein a first exterior case is connected to one side of the deck assembly and to the rear assembly; and an infrared filter operation unit is disposed on the first exterior case to turn on and off an infrared filter of the first camera unit.

8. The apparatus according to claim 7, wherein the first exterior case has at least two of the group consisting of a zoom knob, a photo shutter, a mode selection switch, and a recording button.

9. The apparatus according to claim 1, wherein a rear case is connected to the deck assembly and has a battery mounting portion; and a rear board is disposed in the rear case and is electrically coupled to the main board.

10. The apparatus according to claim 1, wherein a second exterior case has a second display unit mounting portion; and a sub-board is disposed in the second exterior case on an opposite side from the main board when the second exterior assembly is connected to the deck assembly.

11. The apparatus according to claim 10, wherein the second camera unit is disposed on one side of the deck assembly to position the first and second camera units substantially vertically when the first exterior assembly and the deck assembly are connected.

12. The apparatus according to claim 10, wherein the sub-board is disposed substantially parallel to the main board.

13. The apparatus according to claim 10, wherein the sub-board is electrically coupled to the second camera unit and the first display unit and to the main board when the sub-board is connected to the deck assembly.

14. The apparatus according to claim 10, wherein a speaker unit is electrically coupled to the sub-board;

the second exterior case has a plurality of ports adapted to receive external equipment; and the second exterior case has a plurality of function keys to enable a user to select a menu displayed on the first display unit.

15. The apparatus according to claim 1, wherein a first case has a first and a second lens hood, each being opened in correspondence with the first and second camera units, respectively; and a sensor module is disposed in the front case, and has a remote control sensor and a strobe sensor.

16. The apparatus according to claim 1, wherein an upper case covers the first camera unit and the upper portion of the deck assembly and is connected to the second display unit; and a microphone is connected to the upper case.

17. The apparatus according to claim 16, wherein the upper assembly has a flash movably installed on the upper case to move in and out of the upper case.

18. The apparatus according to claim 1, wherein the first camera unit is a digital video camera module.

19. The apparatus according to claim 1, wherein the second camera unit is a digital still camera module.

20. A method of assembling an image photographing apparatus, comprising the steps of:

preparing a first module by connecting a deck assembly, a rear assembly, a first exterior assembly, and a deck cover assembly together, the deck assembly having a deck unit, a main board and a first camera unit, the first exterior assembly having an opening corresponding to the deck unit and encompassing a first side of the deck assembly, a rear assembly covering a rear side of the deck assembly, and the deck cover assembly being adapted to open and close the first exterior assembly;

preparing a second module by connecting the second exterior assembly to an upper assembly, the second exterior assembly having a second camera unit and a first display unit to encompassing a second side of the deck assembly, and the upper assembly having a second display unit and covering an upper portion of the deck assembly; and connecting the first module and the second module dispose the first and second camera units substantially vertically; and connecting the front assembly to the first and second modules, the front assembly covering a front side of the deck assembly.

21. The method according to claim 20, further comprising connecting the rear assembly to the deck assembly;

connecting the first exterior assembly on the first side of the rear assembly and the deck assembly; and connecting the deck cover assembly to the deck assembly to form the first module.

22. The method according to claim 20, further comprising electrically coupling a sub-board to the first display unit and the second camera unit, and electrically coupling the sub-board and the main board.

* * * * *